United States Patent [19]

Kato

[11] Patent Number: 5,460,695
[45] Date of Patent: Oct. 24, 1995

[54] METHOD OF DEINKING WASTE PAPER FOR RECLAMATION THEREOF

[75] Inventor: Yasuo Kato, Hyogo, Japan

[73] Assignee: Nissin Kagaku Kenkyusho Co., Ltd., Ehime, Japan

[21] Appl. No.: 257,920

[22] Filed: Jun. 10, 1994

[51] Int. Cl.$^6$ .................................................. D21C 5/02
[52] U.S. Cl. ...................................... 162/5; 162/8
[58] Field of Search ..................... 162/5, 8; 252/60, 252/61

[56] References Cited

U.S. PATENT DOCUMENTS

| | | | |
|---|---|---|---|
| 4,964,949 | 10/1990 | Hamaguchi et al. | 162/5 |
| 5,223,089 | 6/1993 | Kato | 162/5 |

FOREIGN PATENT DOCUMENTS

| | | | |
|---|---|---|---|
| 729070 | 3/1966 | Canada | 162/5 |
| 197607 | 7/1976 | Japan | 162/5 |
| 51892 | 4/1980 | Japan | 162/5 |
| 165592 | 8/1988 | Japan . | |
| 5-071086 | 3/1993 | Japan . | |

Primary Examiner—Karen M. Hastings
Attorney, Agent, or Firm—Wenderoth, Lind & Ponack

[57] ABSTRACT

A method of deinking waste paper for reclamation thereof, which comprises disintegrating waste paper with an alkali in water in the presence of a polyoxyalkylene ether compound having the formula $$R-O(PO)_x(AO)_y(PO)_z-H$$

wherein R is an alkyl or alkenyl of 8–22 carbons, or an alkylphenyl wherein the alkyl has 4–12 carbons; PO is an oxypropylene group; and AO is an oxyethylene group, or a mixed oxyalkylene group composed of an oxyethylene group and at least one oxyalkylene group selected from the group consisting of an oxypropylene group and an oxybutylene group: and x is a numeral of 3–15, y is a numeral of 20–40, and z is a numeral of 5–20, in an amount effective as a deinking agent.

5 Claims, No Drawings

METHOD OF DEINKING WASTE PAPER FOR RECLAMATION THEREOF

FIELD OF THE INVENTION

This invention relates to a method of deinking waste paper for reclamation thereof. Hore particularly, the invention relates to a method of deinking waste paper such as newspapers or magazines using a specific higher alcohol polyoxyalkylene ether or alkylphenol polyoxyalkylene ether as a deinking agent in the known floatation method to provide deinked pulp having a high degree of whiteness and low residual ink droplet number.

DESCRIPTION OF THE PRIOR ART

Waste paper such as newspapers or magazines have been reclaimed by disintegrating the waste paper to pulp fibers and then removing printing ink components such as carbons or vehicles from the pulp fibers to recover the pulp fibers for reuse as paper making material. The reclamation of waste paper becomes more important on account of shortage of wood resources and rise in their prices, and there is a strong demand for a higher performance deinking agent since it becomes more difficult to deink the recent waste paper on account of changes in the printing techniques, printing systems and printing ink compositions.

The floatation method has been known as a representative of the deinking methods of waste paper for its reclamation. According to the floatation method, the waste paper is disintegrated with an alkali in water to provide an aqueous slurry of pulp fibers, a deinking agent is added thereto to remove the ink components from the waste paper and allow the ink composition to coagulate, blowing air into the slurry so that it foams and the ink composition adheres to the foam, and then the foam is removed from the slurry together with the ink composition to leave deinked pulp fibers. The resultant pulp fibers are bleached for reuse as paper making material.

A variety of surfactants have been used as a deinking agent in the floatation method, and a higher fatty acid soap such as stearic acid soap is a representative. The higher fatty acid soap has a high performance for removing ink compositions from waste paper. However, the higher fatty acid soap is not sufficiently foamable so that the coagulated and floated ink composition is incompletely removed, and thus the recovered pulp fibers have still a number of ink spots therein. There is also a tendency that the released ink composition deposits on the deinking device used. Moreover, it is necessary to use the higher fatty acid soap in a large amount to obtain intended deinking results, and accordingly the deinking cost is high.

In order to solve these problems, there have been recently proposed a number of deinking agents other than the higher fatty acid soap, among which are anionic surfactants such as sodium alkylbenzenesulfonates, higher alcohol sulfate salts, alpha-olefin sulfonates or dialkyl sulfosuccinates; or nonionic surfactants such as higher alcohols, alkylphenols, ethylene oxide and/or propylene oxide adducts to higher alcohols or alkylphenols.

Very recently, there has been proposed a deinking agent containing a higher alcohol polyoxyethylenepropylene ether, as disclosed in Japanese Patent Application Laid-open No. 55-51891, or a deinking agent comprising a higher alcohol polyoxyethylenepropylene ether together with a fatty acid or its salt, as disclosed in Japanese Patent Application Lid-open No. 61-186592. A further deinking agent is also known which contains, as one of the components, a higher alcohol polyoxyethylenepropylene ether, as disclosed in Japanese Patent Application Lid-open No. 63-165592.

The above mentioned agents are improved in many respects compared with the higher fatty acid soap, however, the ink removal performance when used in the floatation method is not satisfactory.

BRIEF SUMMARY OF THE INVENTION

It is, therefore, an object of the invention to provide a method of deinking waste paper such as newspapers or magazines using a specific deinking agent in the known floatation method to provide deinked pulp having a high degree of whiteness and low residual ink droplet number.

The invention provides a method of deinking waste paper for reclamation thereof, which comprises disintegrating waste paper with an alkali in water in the presence of a polyoxyalkylene ether compound having the formula

wherein R is an alkyl or alkenyl of 8–22 carbons, or an alkylphenyl wherein the alkyl has 4–12 carbons: PO is an oxypropylene group: and AO is an oxyethylene group, or a mixed oxyalkylene group composed of an oxyethylene group and at least one oxyalkylene group selected from the group consisting of an oxypropylene group and an oxybutylene group: and x is a numeral of 3–15, y is a numeral of 20–40, and z is a numeral of 5–20, as a deinking agent.

DETAILED DESCRIPTION

The polyoxyalkylene ether compound used in the invention as a deinking agent is either a polyoxyalkylene ether of a higher alcohol ROH wherein R is an alkyl or alkenyl of 8–22 carbons or a polyoxyalkylene ether of an alkylphenol ROH and R is alkylphenyl wherein the alkyl has 4–12 carbons.

The polyoxyalkylene ether compound is structurally characterized by having oxypropylene groups ((PO)x) bonded to the RO group derived from the higher alcohol or alkylphenol as well as oxypropylene groups ((PO)z-H) at the end of the molecule.

Since the deinking agent used in the method of the invention contains the above polyoxyalkylene ether compound as a deinking agent it is well-balanced in dispersibility and coagulating ability of ink compositions. Thus the use of the deinking agent according to the invention in the floatation method provides deinked pulp having a high degree of whiteness and low residual ink droplet number.

It is preferred that the polyoxyalkylene ether compound has an average molecular weight 1000–8000, more preferably 2000–3000, since such a polyoxyalkylene ether compound has especially eminent deinking effects.

A further feature of the polyoxyalkylene ether compound is that it is liquid at normal temperatures, and it can be added as it is to a disintegrator when waste paper is disintegrated in water so that the energy cost for deinking treatment is greatly reduced.

The higher alcohol polyoxyalkylene ether may be produced by a known method in which, as higher alcohol components, there may be used, for example, octyl alcohol, lauryl alcohol, cetyl alcohol or stearyl alcohol. A synthetic alcohol such as an oxo alcohol or a secondary alcohol may also be used as the higher alcohol component. The higher alcohol component may be used singly or as a mixture of two or more. In turn, the alkylphenol polyoxyalkylene ether may also be produced by a known method in which, as alkylphenol components, there may be used, for example, octylphenol, nonylphenol or dodecylphenol. The alkylphenol component may also be used singly or as a mixture of two or more.

In the above formula, AO is an oxyethylene group, or a mixed oxyalkylene group composed of an oxyethylane group and at least one oxyalkylene group selected from the group consisting of an oxypropylene group and an oxybutylene group. Thus, the AO may be an oxyethylene group, oxyethylene/oxypropylene group, oxyethylene/oxybutylene group, oxyethylene/oxypropylene/oxybutylene group or an oxybutylene group. These oxyalkylene groups may be in the form of random copolymers or block copolymers.

According to the method of the invention, the polyoxyalkylene ether compound is used in the stage of disintegrating waste paper in water with an alkali such as sodium hydroxide usually in an amount of 0.2–1.0% by weight based on the waste paper, although not limited to the exemplified.

The method of the invention has an important feature in that the deinking agent can be used as a single component agent. However, the agent may be used together with any known deinking agent such as anionic surfactants or nonionic surfactants, for example, a higher fatty acid, a higher alcohol, a higher alcohol sulfate salt, a sulfate salt of ethylene oxide adducts to higher alcohols, alkylbenzene sulfonates, or alkylphenols.

As above set forth, the method of the invention uses a specific higher alcohol polyoxyalkylene ether or alkylphenol polyoxyalkylene ether as a deinking agent in the floatation method for waste paper reclamation, and thus the method provides deinked pulp having a high degree of whiteness and low residual ink droplet number. In addition, the deinking agent used is a single component liquid agent so that it can be used easily and reduces the energy required in the floatation method in the deinking process.

The invention will be described in more detail with reference to examples, however, the invention is not limited to the examples.

EXAMPLES

Eighty percent by weight of waste newspapers (offset/relief ratio: 6/4) and 20% by weight of waste leaflets were cut into pieces and placed in a bench disintegrator (JIS P-8209), to which were then added 1.5% by weight of sodium hydroxide, 3.5% by weight of No. 3 sodium silicate, 1.0% by weight of a 30% aqueous solution of hydrogen peroxide and 0.3% by weight of a deinking agent indicated in Table 1, each based on the weight of the waste paper, and then warm water so that the resultant aqueous slurry contained the waste paper in an amount of 10% by weight. The waste paper was then disintegrated at 55° C. for 20 minutes. The resultant pulp slurry was diluted to a pulp concentration of 1% by weight, and then the floatation treatment was carried out at 30° C. for 10 minutes with the use of a testing floatator.

The resultant pulp slurry was formed into a sheet having a weight of 150 g/m$^2$ using a standard type sheeting machine (JIS P-8209). The whiteness of the sheet was measured with a Hunter whiteness meter according to JIS P-8123. The residual ink droplet number was measured with an image analyzer (×100). The results are summarized in Table 1, in which EO, PO, BO and Ph represent oxyethylene, oxypropylene, oxybutylene and phenyl group, respectively.

TABLE 1

| | Deinking Agent | Whiteness (%) | Residual Ink Droplet Number |
|---|---|---|---|
| Examples | | | |
| 1 | $C_{16}H_{33}O(PO)_5(EO)_{30}(PO)_5H$ | 55.6 | 11 |
| 2 | $C_{16}H_{33}O(PO)_7(EO)_{40}(PO)_{10}H$ | 55.4 | 16 |
| 3 | $C_{18}H_{33}O(PO)_3[(EO)_{20}(BO)_5](PO)_7H^{*)}$ | 56.1 | 12 |
| 4 | $C_{20}H_{37}O(PO)_5(EO)_{40}(PO)_{10}H$ | 56.4 | 12 |
| 5 | $C_{18}H_{37}O(PO)_5(EO)_{35}(PO)_{15}H$ | 55.9 | 15 |
| 6 | $C_8H_{14}-Ph-O(PO)_5[(EO)_{30}(PO)_{10}H$ | 56.3 | 14 |
| 7 | $C_8H_{14}-Ph-O(PO)_5[(EO)_{35}(BO)_{10}](PO)_{10}H^{*)}$ | 55.1 | 16 |
| Comparative Examples | | | |
| 1 | $C_{10}H_{33}O(EO)_{15}(PO)_3H$ | 50.8 | 31 |
| 2 | $C_{10}H_{37}O(EO)_{20}(PO)_5(EO)_5H$ | 50.1 | 34 |
| 3 | $C_9H_{19}-Ph-O(EO)_5(PO)_{30}(EO)_{20}H$ | 51.3 | 32 |
| 4 | $C_8H_{27}-Ph-O(EO)_{10}(PO)_7(EO)_{10}H$ | 50.4 | 40 |
| 5 | $C_{16}H_{37}O(PO)_2(EO)_5(PO)_5H$ | 50.2 | 35 |
| 6 | $C_{18}H_{37}O(PO)_3(EO)_{50}(PO)_2H$ | 50.8 | 30 |

*)The polyoxyalkylene part [(EO) and (BO)]has random structure.

As seen in Table 1, the method of the invention provides deinked pulp having a higher degree of whiteness and lower residual ink droplet number than a method wherein a higher alcohol polyoxyalkylene ether or an alkylphenol polyoxyalkylene ether which has oxyethylene groups bonded to the alkyloxy group derived from higher alcohol or the phenoxy group derived from alkylphenol is used as a deinking agent.

It is further noted that the use of the polyoxyalkylene ether compound which contains oxypropylene groups and oxyethylene groups (or oxyalkylene groups) in a specific range of molar ratios provides especially eminent deinking results.

What is claimed is:

1. A method for deinking waste paper for reclamation, which comprises disintegrating waste paper with an alkali in water in the presence of a polyoxyalkylene ether compound having a molecular weight of 1000–8000 and the formula

where R is an alkyl or alkenyl of 8–22 carbons, or an alkylphenyl wherein the alkyl has 4–12 carbons; PO is an oxypropylene group; and AO is an oxyethylene group, or a mixed oxyalkylene group composed of an oxyethylene group and at least one oxyalkylene group selected from the group consisting of an oxypropylene group and an oxybutylene group; x is an integer from 3–15, y is an integer from 20–40, and z is an integer from 5–20, in an amount effective as a deinking agent.

2. The method as claimed in claim 1 wherein the polyoxyalkylene ether compound has a molecular weight of 2000–3000.

3. The method as claimed in claim 1 wherein the polyoxyalkylene ether compound is used in an amount of 0.2–1.0% by weight based on the waste paper.

4. The method as claimed in claim 1 wherein R in the formula is derived from a higher alcohol selected from the group consisting of octyl alcohol, lauryl alcohol, cetyl alcohol, stearyl alcohol, a synthetic alcohol, and a mixture of two or more of these.

5. The method as claimed in claim 1 wherein R in the formula is derived from an alkylphenol selected from the group consisting of octylphenol, nonylphenol, dodecylphenol, and a mixture of two or more of these.

* * * * *

Adverse Decisions in Interference

Patent No. 5,460,695, Yasuo Kato, METHOD OF DEINKING WASTE PAPER FOR RECLAMATION THEREOF, Interference No. 104,052, final judgment adverse to the patentee rendered January 9, 1998, as to claims 1-5.

*(Official Gazette April 21, 1998)*